United States Patent Office 3,285,580
Patented Nov. 15, 1966

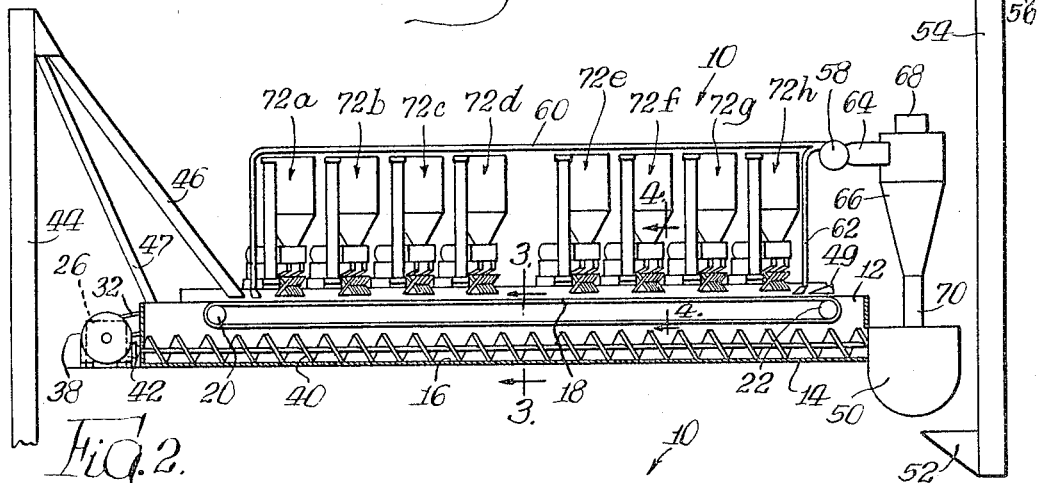

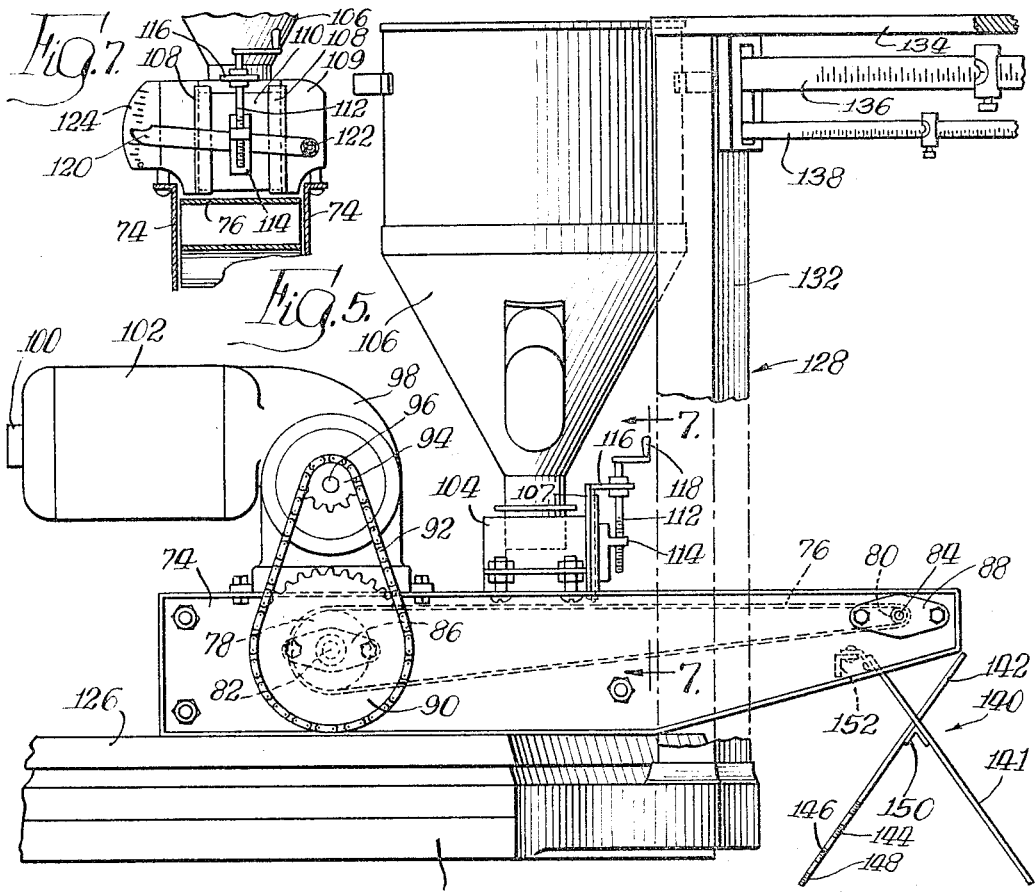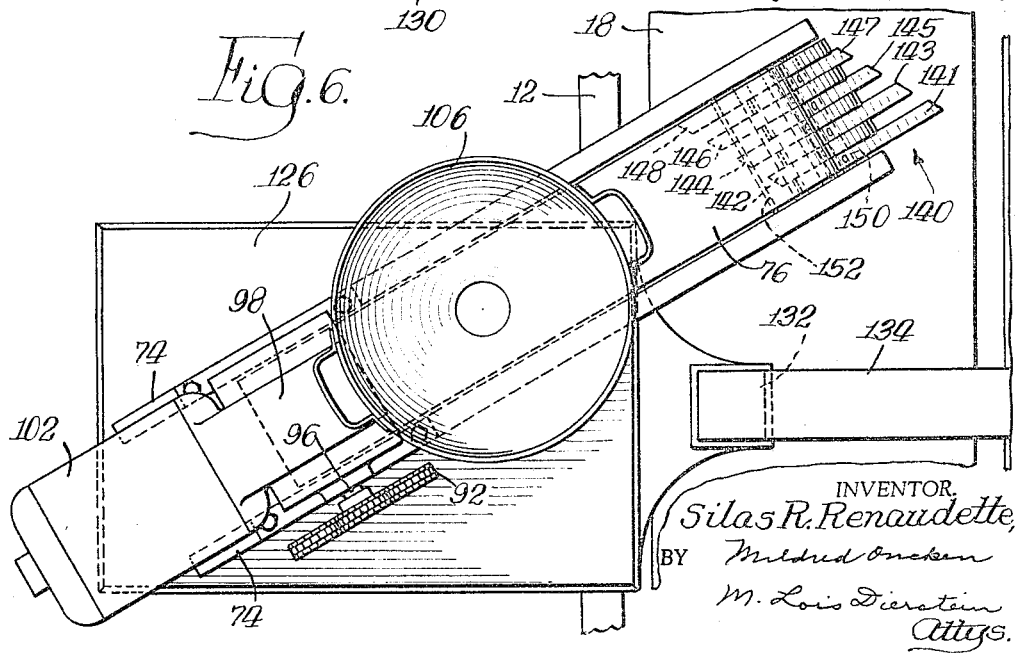

3,285,580
APPARATUS FOR FEEDING AND
MIXING MATERIALS
Silas R. Renaudette, Melrose, Mass., assignor to Corn
Products Company, New York, N.Y., a corporation of
Delaware
Filed July 1, 1964, Ser. No. 379,474
13 Claims. (Cl. 259—11)

My present invention relates generally to apparatus for feeding and mixing materials, and more particularly to apparatus for adding drugs or drug pre-mixes to formulated feed.

It is an object of my present invention to provide apparatus for feeding and mixing a small, or even minute, amount of additives, such as drugs, to a large amount of material such as formulated feed.

It is another object of my present invention to provide apparatus for accurately controlling the proportions of the additives being mixed with the feed.

It is another object of my present invention to provide apparatus for evenly distributing the additives relative to the feed so that accurate dispersion of the additives throughout the feed is obtained.

It is a further object of my present invention to provide apparatus adapted for simultaneously feeding a plurality of drug additives in differing quantities to the feed.

Now in order to acquaint those skilled in the art with the manner of constructing and using apparatus in accordance with the principles of my present invention, I shall describe in connection with the accompanying drawings a preferred embodiment of my invention.

In the drawings:

FIGURE 1 is a view, partly schematical and partly elevational, of the apparatus of my present invention;

FIGURE 2 is a plan view of the apparatus shown in FIGURE 1;

FIGURE 3 is a sectional view, on an enlarged scale, taken substantially along the line 3—3 in FIGURE 1, looking in the direction indicated by the arrows;

FIGURE 4 is a fragmentary view, partly in section and partly in elevation, on an enlarged scale, taken substantially along the line 4—4 in FIGURE 1, looking in the direction indicated by the arrows;

FIGURE 5 is a side elevational view, on an enlarged scale, of one of the feed devices of the apparatus of FIGURE 1;

FIGURE 6 is a plan view of the feed device of FIGURE 5; and

FIGURE 7 is a fragmentary view, partly in section and partly in elevation, taken substantially along the line 7—7 in FIGURE 5, looking in the direction indicated by the arrows.

Referring now to FIGURES 1, 2 and 3, there is indicated generally by the reference numeral 10 apparatus, incorporating the principles of my present invention, for feeding and mixing materials. The apparatus 10 comprises a pair of laterally spaced longitudinally extending side channel or frame members 12 which are suitably secured along the upper edges of a generally U-shaped housing 14 that serves to define a trough 16. Extending longitudinally intermediate of the channel members 12 is an endless conveyor belt 18 which is suspended at its ends on friction pulleys 20 and 22 having shaft ends suitably journalled in the channel members 12. The upper run of the conveyor belt 18 is maintained in a horizontal plane by means of a longitudinal structural member 23 supported by the side frame members 12. The friction pulley 20 is drivingly connected to the output shaft 24 of a gear reduction unit 26 by means of a pair of grooved pulleys 28 and 30 and a V-belt 32. The input shaft 34 of the gear reduction unit 26 is suitably connected to the drive shaft 36 of an electric motor 38. Underlying the belt conveyor 18, and extending beyond both ends thereof, within the trough 16 of the housing 14 is a spiral or screw conveyor 40. The left end of the spiral conveyor 40, as viewed in FIGURES 1 and 2, has suitable connection with an output shaft 42 of the gear reduction unit 26. When the electric motor 38 is energized, the conveyor belt 18 and the spiral conveyor 40 are driven from the gear reduction unit 26 whereby to simultaneously convey material 43 (shown in FIGURE 3) from left to right as viewed in FIGURES 1 and 2.

Bulk materials, with which additives are to be mixed, are transmitted to the one ends of the conveyor belt 18 and the spiral conveyor 40 by means of a vertical lift or elevator conveyor 44 provided with discharge chutes 46 and 47. As will be presently described in detail, additives 48 are applied to the material 43 deposited on, and moved along, the upper run of the conveyor belt 18, and a plow-like device 49 provided at the end of the belt 18 serves to fold the additives into the adjacent conveyed material. The material and additives leaving the right end of the conveyor belt 18, as viewed in FIGURE 1, drop into the adjacent end of the trough 16 and are mixed with the material 43 transmitted along the trough by the spiral conveyor 40. The resultant mixture is ejected into an emulsifier or mixer 50 for final blending and then discharged into the lower inlet 52 of a vertical lift or elevator conveyor 54 having a discharge chute 56 for delivery of the resultant mixture to a bulk storage bin or to packaging apparatus. To control any dust at both the forward and discharge ends of the conveyor belt 18, there is included in the apparatus 10 a dust collecting system comprising a blower 58 connected with suction conduits 60 and 62. The blower 58 discharges into the tangential inlet 64 of a hydrocyclone 66 in which dust and air are separated, with the air being expelled through the overflow outlet 68 into the surrounding atmosphere and the dust being returned through the underflow outlet 70 directly into the material within the emulsifier 50.

Additives are adapted to be applied to the material being moved along the upper run of the conveyor belt 18 by means of one or more feed devices indicated generally by the reference numerals 72a–72h. Since each of the feed devices 72a–72h is identical in construction and operation, only one will be described in detail, reference being now being made to FIGURES 4–7. Each of the feed devices comprises a base defined by a pair of laterally spaced side frame members 74. Disposed intermediate of the side frame members 74, and extending lengthwise thereof, is an endless belt 76 suspended at its ends on friction pulleys 78 and 80. The ends of the shafts 82 and 84 of the pulleys 78 and 80 are journalled in suitable bearing blocks 86 and 88 secured to the outboard sides of the side frame members 74. The shaft 82 of the friction pulley 78 has secured on one end thereof, outboard of the adjacent side frame member 74, a sprocket gear 90 which is drivingly connected by means of a chain 92 to a sprocket pinion 94 secured to the output shaft 96 of a gear reducing unit 98. The input shaft (not shown) of the gear reducing unit 98 has connection with the drive shaft 100 of an electric motor 102. When the motor 102 is energized, the belt 76 is driven whereby to convey additives, which have been deposited thereon, from left to right as viewed in FIGURE 5.

Extending transversely of the side frame members 74, and suitably secured to the upper edges thereof, is a receptacle 104 which provides support for a removable hopper 106 containing additives. Along the sides of an opening formed in the side plate 107 of the receptacle 104 are a pair of vertical flange members 108 which guidingly retain in position a vertically movable gate 110. The gate 110 is adapted to be adjusted vertically by means of a threaded screw 112 having threaded engagement with the threaded opening in a bracket member 114 secured to the outer face of the gate 110. The upper end of the threaded screw 112 is journalled in the horizontal flange portion 116 of the side plate 107. For convenience, an offset hand knob 118 is mounted on the upper end of the threaded screw 112. Rotation of the screw 112 serves to move the gate 110 vertically to permit adjustment of the opening between the bottom edge of the gate 110 and the floor of the receptacle 104 whereby the cross sectional area of the stream of additive flowing from the hopper 106, through the receptacle 104, and onto the belt 76, may be regulated. So that the size of the gate opening may be readily apparent at all times, an indicating lever 120 is pivotally mounted at 122 to the receptacle plate 107 and is arranged for vertical swinging movement in response to vertical movement of the gate 110. Suitable indicia 124 are provided on the side plate 107 adjacent the outer end of the indicating lever 120.

The described feed device is mounted on the platform 126 of a scale 128 having a base 130. Extending upwardly from the base 130 is a column 132 with a lateral arm 134 below which a pair of beams 136 and 138 are suspended. The base 130 of the scale 128 is disposed alongside of the main conveyor belt 18 with the forward end of the feed device overlying the belt 18. In order that the additive being discharged from the forward end of the belt 76 of the feed device is evenly distributed over the material being conveyed thereunder by the main belt 18, a distributor, indicated generally by the reference numeral 140, is suspended from the feed device. The distributor 140 comprises a plurality of thin slat-like members 141–148. One set of alternater members 141, 143, 145 and 147 is secured intermediate of the ends thereof to one side of an inverted V-shaped brace 150, and the other set of alternate members 142, 144, 146 and 148 is secured intermediate of the ends thereof to the other side of the brace 150, whereby the two sets of alternate members lie in intersecting planes. The distributor 140 may be mounted to the feed device, for example, by securing the upper ends of the one set of members 141, 143, 145 and 147 to a bracket 152 carried by the side frame members 74. Preferably, the distributor 140 is mounted so that the brace 150, and thus the axis of intersection of the planes of the two sets of members, is disposed diagonally of the main belt 18. Also, the slat-like members of each set are preferably formed with progressively increasing lengths in a direction moving away from the median longitudinal axis of the belt 18. By reason of this arrangement, additives discharged at the forward end of the belt 76, which drop onto the members, are guided angularly downwardly therealong and are substantially evenly distributed over the widthwise surface of the material conveyed thereunder by the main belt 18.

The above-described apparatus is especially adapted for adding low levels, or minute quantities, of drugs or drug pre-mixes to formulated animal feed. In this particular application, bulk formulated feed 43 received by the elevator conveyor 44 is divided between the two discharge chutes 46 and 47, 95% of the feed being directed to the belt 18 and 5% through the trough 16. With a 16 inch wide conveyor belt 18 travelling at 600 feet per minute, each 100 pounds of feed is spread out over 40 square feet of surface area, presenting a smooth, thin layer of formulated feed to which the drug additives may be suitably applied. The spiral conveyor 40, which is an 18 inch screw revolving at 200 r.p.m., conducts 5 percent of the formulated feed and acts as a wiper for picking up any dust or other carryover from the belt 18. As a result, complete transmission of drugs and feed into the emulsifying mixer 50 is assured, and no trace of drugs is left around or under the belt 18.

In connection with the feed devices 72a–72h, anyone or more of which may be used to feed different drug additives 48 to the feed 43 being conveyed on the belt 18, each belt 76 is preferably of white neoprene and is adapted to be selectively driven at speeds varying between 5 and 25 feet per minute. The movable gate 110 at the side of the receptacle 104 is 3 inches wide with the screw adjustment 112 accommodating gate openings from ⅛ inch to 1 inch. The hopper 106, in the apparatus disclosed, has a capacity of 60 pounds and is equipped with a vibrator to insure smooth delivery of additives. The hopper 106 is also provided with a conventional hand slide to permit selective interruption of the flow of additives therefrom whereby to facilitate changes in hoppers. Each platform scale 128 preferably has one beam 136 graduated in one-half pounds from 0 to 100 pounds and the other beam 138 graduated in one-tenth pounds from 0 to 10 pounds. The slat-like members of each distributor 140 are preferably fabricated of thin stainless steel and are arranged to vibrate slightly as the drug additives 48 move downwardly therealong whereby to spread the drugs uniformly over the width of the stream of feed 43 on the belt 18. The emulsifying mixer 50 is suitably a Sprout-Waldron single-agitator mixer adjusted for optimum blending and cleanout.

The speed of the conveyor belt 18, the speeds of the belts 76, and the sizes of the openings of the gates 110 are correlated so that predetermined levels of drugs, even in minute quantities, may be accurately added to and dispersed throughout every pound of formulated feed being processed. In the normal automatic installation, the electric motors 102 of the feed devices are electrcially controlled so that they will start and stop in response to the presence or absence of feed on the belt 18. The feed devices are also equipped with manual controls to permit emptying, priming and testing of each feeder individually. It is to be appreciated that the number of feed devices arranged along the conveyor belt 18 may be increased or decreased from that shown, and that the number of feed devices used at any particular time will depend upon the number of different drugs being added to the formulated feed. Finally, since each feed device is independent, different drugs may be simultaneously added in differing quantities to the formulated feed.

While I have shown and described what I believe to be a preferred embodiment of my present invention, it will be understood by those skilled in the art that various modifications and rearrangements may be made therein without departing from the spirit and scope of my invention.

I claim:
1. Apparatus for feeding and mixing materials, comprising first horizontal conveyor means, second horizontal conveyor means underlying said first conveyor means, means for introducing material at the one ends of said first and second conveyor means, means for feeding additives to the material being carried by said first conveyor means, and means for receiving and blending the material and additives discharged from the other ends of said first and second conveyor means.

2. Apparatus for feeding and mixing materials, comprising an endless belt conveyor, a spiral conveyor underlying said belt conveyor, means for introducing material onto one end of said belt conveyor and into one end of said spiral conveyor, means for feeding additives to the material being carried by said belt conveyor, and means for receiving and blending the material and additives discharged from the other ends of said belt and spiral conveyors.

3. Apparatus for feeding and mixing materials, comprising an endless belt conveyor, a spiral conveyor underlying said belt conveyor, means for introducing formulated feed in a ratio of 95 percent onto one end of said belt conveyor and 5 percent into one end of said spiral conveyor, means for feeding drug additives to the formulated feed being carried by said belt conveyor, and an emulsifier for receiving and blending the formulated feed and drug additives discharged from the other ends of said belt and spiral conveyors.

4. Apparatus for feeding and mixing materials, comprising primary conveyor means, means for introducing material onto one end of said primary conveyor means, at least one feed device being comprised of secondary conveyor means for conducting additives from a hopper to the material being carried by said primary conveyor means, and a distributor carried by said feed device for receiving additives discharged from said secondary conveyor means and distributing the same in a direction widthwise of said primary conveyor means.

5. Apparatus for feeding and mixing materials, comprising an endless belt conveyor, a spiral conveyor underlying said belt conveyor, means for introducing material onto one end of said belt conveyor and into one end of said spiral conveyor, at least one feed device for feeding additives to the material being carried by said belt conveyor, an emulsifier for receiving and blending the material and additives discharged from the other ends of said belt and spiral conveyors, said feed device being comprised of a moving belt, a hopper overlying said moving belt and containing additives, means for regulating the flow of additives from said hopper to said moving belt, a distributor suspended from said feed device for receiving additives discharged from said moving belt and distributing the same in a direction widthwise of said belt conveyor, and said distributor being comprised of a plurality of slat-like members arranged alternately in two sets with one set of alternate members being arranged in one plane and with the other set of alternate members being arranged in another plane intersecting said one plane.

6. A feed device comprising a frame, a moving belt suspended within said frame, a hopper overlying said belt for containing additives, means for regulating the flow of additives from said hopper to said belt, and a distributor suspended from said frame for receiving additives discharged from said belt and distributing the same in a direction lengthwise of said belt.

7. A feed device comprising a frame, a moving belt suspended within said frame, a hopper overlying said belt for containing additives, means for regulating the flow of additives from said hopper to said belt, a distributor suspended from said frame for receiving additives discharged from said belt and distributing the same in a direction lengthwise of said belt, and said distributor being comprised of a plurality of slat-like members arranged alternately in two sets with one set of alternate members being arranged in one plane and with the other set of alternate members being arranged in another plane intersecting said one plane.

8. A material distributor comprising a plurality of side-by-side slat-like members arranged alternately in two sets, one set of alternate members being arranged in one plane, the other set of alternate members being arranged in another plane intersecting said one plane, and the members of each set being of varying lengths.

9. A device for use in distributing particulate flowable material from storage means onto the surface of a travelling layer of solids, comprising: a frame; storage means for containing a supply of a particulate, flowable material; conveyor means mounted on said frame and disposed to receive material from said storage means and to carry the material from said storage means to a distributor; and a distributor that is disposed to receive material from said conveyor means and to distribute it onto the surface of a travelling layer of solids having a path of movement that is below said distributor; said distributor being formed with a plurality of separate inclined surfaces that are arranged to receive material from the conveyor means, to separate it into a corresponding plurality of flowing streams on said respective inclined surfaces, and to discharge said streams at locations on the surfaces of said travelling layer that are spaced from each other.

10. A device in accordance with claim 9 wherein said distributor is formed from a plurality of slat-like members that provide said sepaarte inclined surfaces.

11. A device in accordance with claim 10 wherein said slat-like members are disposed with each adjacent pair of members being inclined in opposite directions respectively relative to the vertical.

12. A device in accordance with claim 9 including adjustable means for regulating the amount of material received by said conveyor means from said storage means.

13. A device in accordance with claim 12 wherein said conveyor means is an endless belt and said adjustable means comprises a gate in said storage means with an adjustable discharge opening.

References Cited by the Examiner

UNITED STATES PATENTS 2,108,999  2/1938  Sisley et al. _____ 259—11 X
3,182,969  5/1965  Rupp _____ 259—25

FOREIGN PATENTS 837,213  11/1938  France.
903,403  8/1962  Great Britain.
476,834  12/1952  Italy.

WALTER A. SCHEEL, *Primary Examiner.*

J. M. BELL, *Assistant Examiner.*